(12) United States Patent
Kayyoor et al.

(10) Patent No.: US 10,839,300 B1
(45) Date of Patent: Nov. 17, 2020

(54) SYSTEMS AND METHODS FOR IDENTIFYING SUBJECT-MATTER EXPERTS

(71) Applicant: Veritas Technologies LLC, Mountain View, CA (US)

(72) Inventors: Ashwin Kayyoor, Sunnyvale, CA (US); Henry Aloysius, Ashburn, VA (US); Mikhail Tarasyuk, Santa Monica, CA (US); Ankit Agarwal, Culver City, CA (US); Stuart Sperling, Los Angeles, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 783 days.

(21) Appl. No.: 15/372,872

(22) Filed: Dec. 8, 2016

(51) Int. Cl.
*G06F 16/95* (2019.01)
*G06Q 10/06* (2012.01)
*G06F 15/16* (2006.01)
*G16B 40/00* (2019.01)
*G06N 5/04* (2006.01)

(52) U.S. Cl.
CPC .................................... *G06N 5/04* (2013.01)

(58) Field of Classification Search
CPC ................................ G06N 5/04; G06F 17/30
USPC ....................................................... 706/1–62
See application file for complete search history.

(56) References Cited

U.S. PATENT DOCUMENTS

| | | | | |
|---|---|---|---|---|
| 2009/0100183 A1* | 4/2009 | Lam | ........................ | G06F 15/16 709/229 |
| 2009/0109872 A1* | 4/2009 | Skubacz | ................. | H04L 41/14 370/254 |
| 2011/0246484 A1* | 10/2011 | Dumais | ............... | G06F 16/9535 707/749 |
| 2014/0317104 A1* | 10/2014 | Isaacs | ................... | G06F 16/332 707/728 |
| 2015/0120713 A1* | 4/2015 | Kim | ...................... | G06F 16/957 707/723 |
| 2017/0249388 A1* | 8/2017 | Alonso | ............ | G06Q 10/06398 |

OTHER PUBLICATIONS

Christopher S. Campbell et al.; Expertise Identification using Email Communications; http://citeseerx.ist.psu.edu/viewdoc/download?doi=10.1.1.68.7482&rep=rep1&type=pdf; CIKM'03; Nov. 3-8, 2003; New Orleans, Louisiana, USA.

(Continued)

*Primary Examiner* — Brandon S Cole
(74) *Attorney, Agent, or Firm* — FisherBroyles, LLP

(57) ABSTRACT

The disclosed computer-implemented method for identifying subject-matter experts may include (i) collecting, by the computing device, a plurality of electronic messages transmitted within an organization, (ii) creating a message graph for the organization, (iii) extracting a plurality of topics from the plurality of electronic messages transmitted within the organization, (iv) annotating the message graph by correlating each topic within the plurality of topics with each edge of the message graph that represents an electronic message related to the topic, and (v) identifying, based on an analysis of the annotated message graph, at least one vertex that represents an expert on at least one topic from the plurality of topics. Various other methods, systems, and computer-readable media are also disclosed.

20 Claims, 5 Drawing Sheets

(56) References Cited

OTHER PUBLICATIONS

Veronica Rivera-Pelayo et al.; Building Expert Recommenders from Email-Based Personal Social Networks; http://wortschatz.uni-leipzig.de/~fwitschel/papers/expertsn.pdf Publishing date unknown, no earlier than 2009.

Byron Dom et al.; Graph-Based Ranking Algorithms for E-mail Expertise Analysis https://users.soe.ucsc.edu/~yiz/papers/o5-sigmodworkshop2003-graphemail.pdf; DMKD'03; Jun. 13, 2003.

* cited by examiner

SYSTEMS AND METHODS FOR IDENTIFYING SUBJECT-MATTER EXPERTS

BACKGROUND

Large organizations often lose a lot of employee productivity because of naturally appearing informational silos. All of the expertise about a given subject may be concentrated in members of one team or department, while members of other teams may not even realize the expertise exists. Members of the organization may spend hours or days figuring out whom to contact for a query involving collaboration with individuals outside of their group. In some cases, an expert may never be found, even when one exists. This problem can diminish productivity and impact the quality of projects that would benefit from the expertise of someone within the organization but outside the immediate group working on the project.

Some traditional systems attempt to solve this problem by creating directories of subject-matter experts within an organization. Unfortunately, these directories are typically manually updated, meaning that they quickly become out of date and considerable effort must be expended to keep them current. Such directories are often not comprehensive, because those assembling the directory may have to determine which subjects the directory should cover. Additionally, some experts may be shy about identifying themselves and may evade inclusion in the directory. The instant disclosure, therefore, identifies and addresses a need for systems and methods for identifying subject-matter experts within an organization.

SUMMARY

As will be described in greater detail below, the instant disclosure describes various systems and methods for identifying subject-matter experts.

In one example, a computer-implemented method for identifying subject-matter experts may include (i) collecting, by the computing device, a group of electronic messages transmitted within an organization, (ii) creating a message graph for the organization where (a) each vertex of the message graph represents a sender of an electronic message within the electronic messages and/or a recipient of an electronic message within the electronic messages and (b) each edge of the message graph represents at least one electronic message within the electronic messages and connects a vertex representing a sender of at least one electronic message with a vertex representing a recipient of at least one electronic message, (iii) extracting a group of topics from the electronic messages transmitted within the organization, (iv) annotating the message graph by correlating each topic within the topics with each edge of the message graph that represents an electronic message related to the topic, and (v) identifying, based on an analysis of the annotated message graph, at least one vertex that represents an expert on at least one topic from the topics.

In one embodiment, identifying the vertex that represents an expert on the topic may include isolating a sub-graph of the annotated message graph that includes electronic messages related to the topic and does not include electronic messages not related to the topic, and analyzing the sub-graph to identify the vertex that represents an expert on the topic. In one embodiment, identifying, based on the analysis of the annotated message graph, at least one vertex that represents an expert on the topic may include generating a ranked list of vertices that represent experts on the topic. In one embodiment, identifying the vertex that represents an expert on at least one topic may include specifying at least two topics and identifying at least one vertex that represents an expert on all of the specified topics.

In one embodiment, collecting, by the computing device, the electronic messages transmitted within the organization may include collecting a predefined percentage of a total number of electronic messages transmitted within the organization. Additionally or alternatively, collecting, by the computing device, the electronic messages transmitted within the organization may include periodically collecting new electronic messages transmitted within the organization.

In one embodiment, annotating the message graph may include labeling each edge of the message graph with a timestamp of at least one electronic message represented by the edge. In some embodiments, identifying, based on the analysis of the annotated message graph, the vertex that represents an expert on the topic may include basing the analysis of the annotated message graph at least in part on at least one timestamp of at least one edge of the annotated message graph.

In some examples, extracting the topics from the electronic messages may include programmatically determining, by the computing device, the topics. In some examples, the computer-implemented method may further include analyzing the annotated message graph in order to identify at least one important topic that is correlated with an amount of edges that meets a predetermined threshold for topic importance.

In one embodiment, a system for implementing the above-described method may include (i) a collection module, stored in memory, that collects, by the computing device, a group of electronic messages transmitted within an organization, (ii) a creation module, stored in memory, that creates a message graph for the organization where (a) each vertex of the message graph represents a sender of an electronic message within the electronic messages and/or a recipient of an electronic message within the electronic messages and (b) each edge of the message graph represents at least one electronic message within the electronic messages and connects a vertex representing a sender of at least one electronic message with a vertex representing a recipient of at least one electronic message, (iii) an extraction module, stored in memory, that extracts a group of topics from the electronic messages transmitted within the organization, (iv) an annotating module, stored in memory, that annotates the message graph by correlating each topic within the topics with each edge of the message graph that represents an electronic message related to the topic, (v) an identification module, stored in memory, that identifies, based on an analysis of the annotated message graph, at least one vertex that represents an expert on at least one topic from the topics, and (vi) at least one physical processor configured to execute the collection module, the creation module, the extraction module, the annotating module, and the identification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) collect, by the computing device, a group of electronic messages transmitted within an organization, (ii) create a message graph for the organization where (a) each vertex of the message graph represents a sender of an electronic message within the electronic messages and/or a recipient of an electronic message within the electronic messages and (b) each edge of the message graph represents at least one electronic message within the electronic messages and connects a vertex representing a sender of at least one electronic message with a vertex representing a recipient of at least one electronic message, (iii) extract a group of topics from the electronic messages transmitted within the organization, (iv) annotate the message graph by correlating each topic within the topics with each edge of the message graph that represents an electronic message related to the topic, and (v) identify, based on an analysis of the annotated message graph, at least one vertex that represents an expert on at least one topic from the topics.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
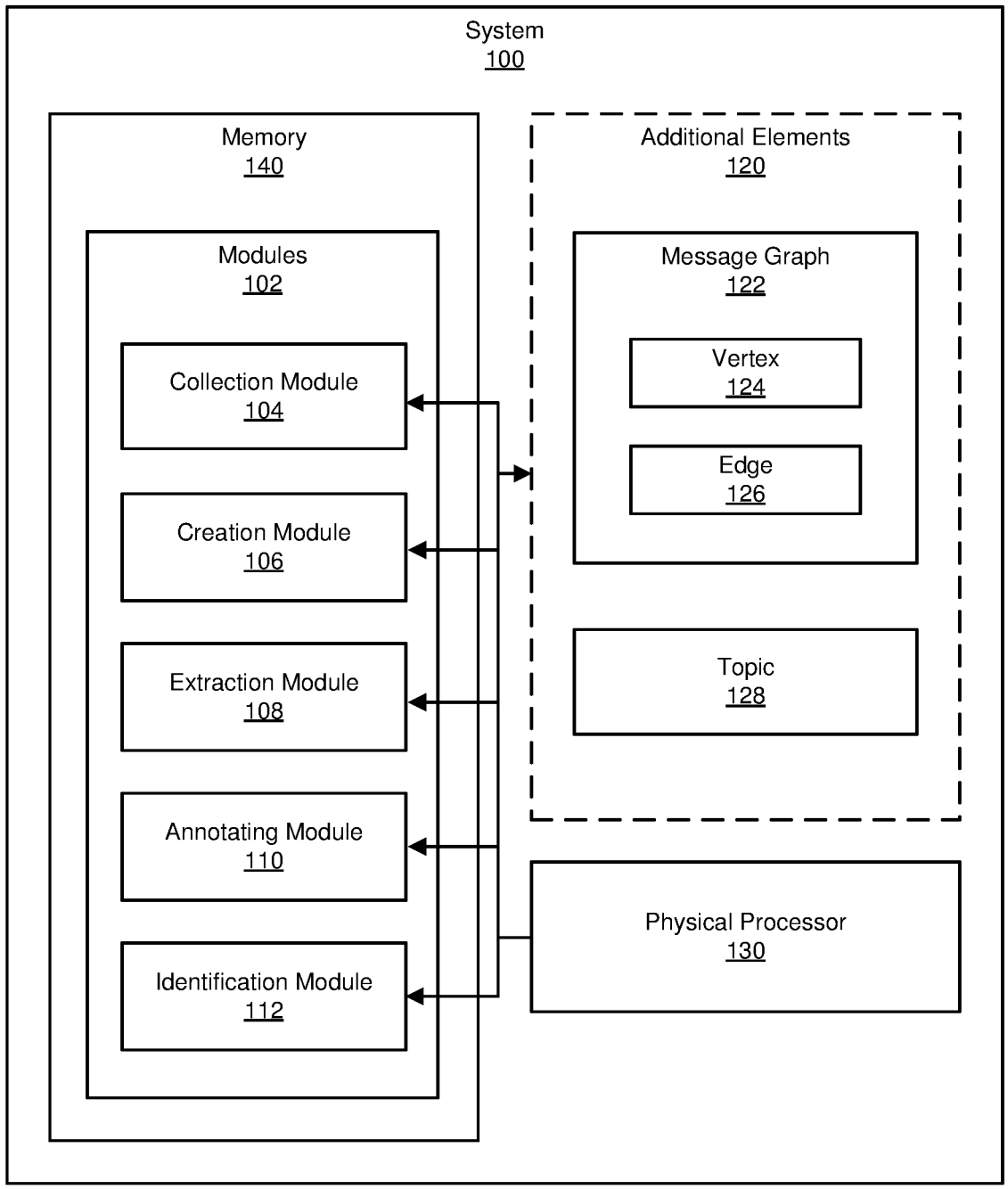
FIG. 1 is a block diagram of an example system for identifying subject-matter experts.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for identifying subject-matter experts. As will be explained in greater detail below, by building a graph of an organization's electronic messages and then mining the data to see who regularly corresponds about a topic, the systems and methods described herein may be able to identify subject-matter experts within an organization without manual intervention. By identifying experts in this way, the systems and methods described herein may be able to maintain a comprehensive and constantly up-to-date directory of subject-matter experts, thereby avoiding the pitfalls of a traditional directory that may miss experts and/or may require frequent manual updates. In addition, the systems and methods described herein may improve the functioning of a computing device by improving the computing device's ability to assist users in locating relevant experts.

Figure 2:
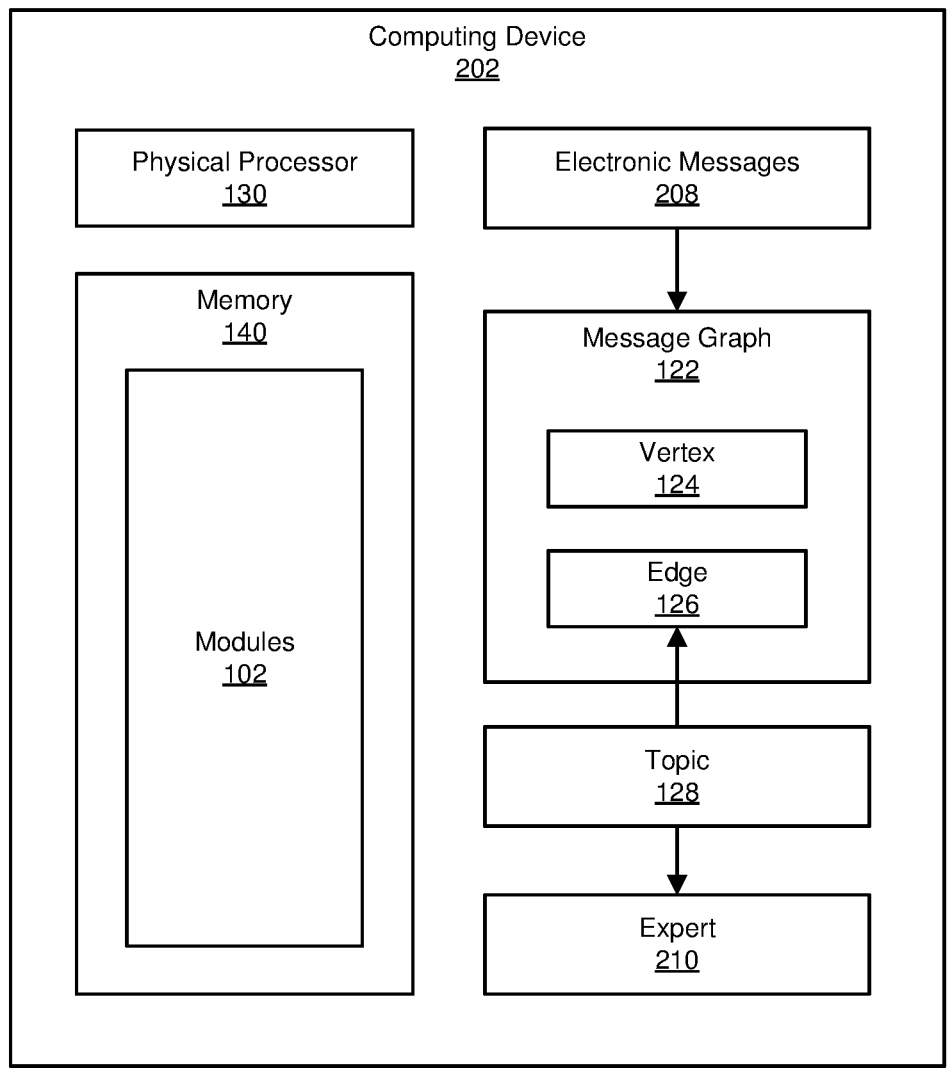
FIG. 2 is a block diagram of an additional example system for identifying subject-matter experts.

The following will provide, with reference to FIGS. 1-2, detailed descriptions of example systems for identifying subject-matter experts. Detailed descriptions of corresponding computer-implemented methods will also be provided in connection with FIG. 3. In addition, detailed descriptions of example message graphs will be provided in connection with FIGS. 4-5.

FIG. 1 is a block diagram of example system 100 for identifying subject-matter experts. As illustrated in this figure, example system 100 may include one or more modules 102 for performing one or more tasks. For example, and as will be explained in greater detail below, example system 100 may include a collection module 104 that collects, by the computing device, a plurality of electronic messages transmitted within an organization. Example system 100 may additionally include a creation module 106 that creates a message graph for the organization. Example system 100 may also include an extraction module 108 that extracts a plurality of topics from the plurality of electronic messages transmitted within the organization. Example system 100 may additionally include an annotating module 110 that annotates the message graph by correlating each topic within the plurality of topics with each edge of the message graph that represents an electronic message related to the topic. Example system 100 may also include an identification module 112 that identifies, based on an analysis of the annotated message graph, at least one vertex that represents an expert on at least one topic from the plurality of topics. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate identifying subject-matter experts. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120 such as message graph 122, vertex 124, edge 126, and/or topics 128. Message graph 122 generally represents any type or form of computing graph that includes vertex 124 and/or edge 126. Topic 128 generally represents any type or form of representation of a subject of discussion.

Example system 100 in FIG. 1 may be implemented in a variety of ways. For example, all or a portion of example system 100 may represent portions of example system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to identify subject-matter experts. For example, and as will be described in greater detail below, collection module 104 may collect, by computing device 202, electronic messages 208 transmitted within an organization. Next, creation module 106 may create a message graph 122 for the organization. Before, after, or at the same time as message graph 122 is created, extraction module 108 may extract a set of topics from electronic messages 208 transmitted within the organization. Next, annotating module 110 may annotate message graph 122 by correlating each topic 128 within the set of topics with each edge 126 of message graph 122 that represents an electronic message related to topic 128. At some later time, identification module 112 may identify, based on an analysis of annotated message graph 122, at least one vertex 124 that represents an expert 210 on topic 128.

Computing device 202 generally represents any type or form of computing device capable of reading computer-executable instructions. In some embodiments, computing device 202 may include a backend computing device with considerable computing power. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Electronic messages 208 generally represents any type or form of digitally transmitted human-readable information. Expert 210 generally represents any individual designated as having a sufficient level of knowledge of one or more topics.

Figure 3:
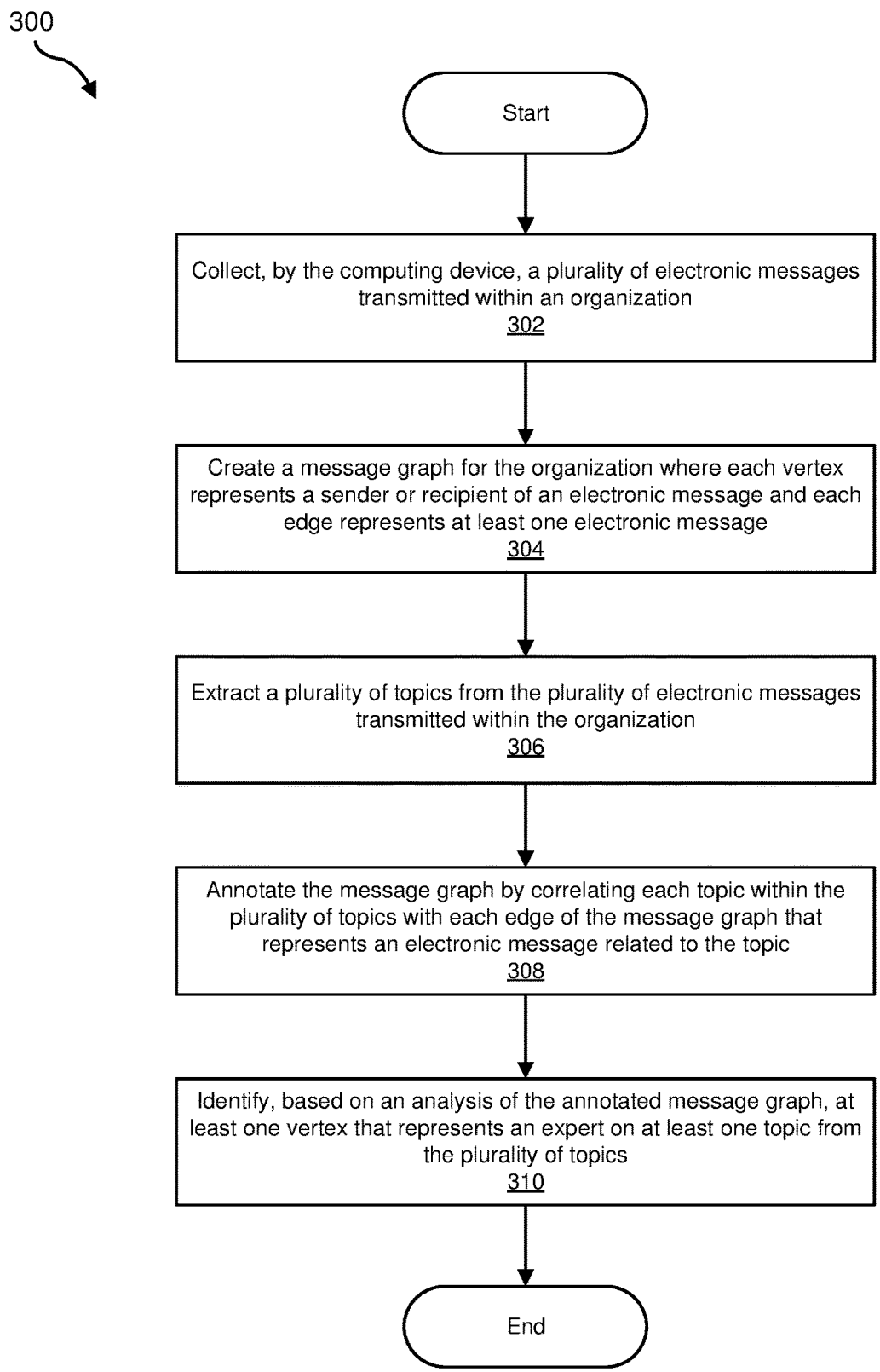
FIG. 3 is a flow diagram of an example method for identifying subject-matter experts.

FIG. 3 is a flow diagram of an example computer-implemented method 300 for identifying subject-matter experts. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may collect, by the computing device, a plurality of electronic messages transmitted within an organization. For example, collection module 104 may, as part of computing device 202 in FIG. 2, collect, by computing device 202, a plurality of electronic messages transmitted within an organization.

The term "electronic message" or "message," as used herein, generally refers to any human-readable data transmitted electronically from one computing system to another. In some embodiments, electronic messages may include emails. Additional examples of electronic messages may include, without limitation, instant messages, forum posts, ticketing system entries, comments, transcripts of audio calls, and/or social networking platform messages.

The term "organization," as used herein, generally refers to any collection of individuals with a common interest and/or purpose. In some embodiments, an organization may be a corporation. Additional examples of an organization may include, without limitation, a non-profit organization, a volunteer organization, an educational institution, a mailing list, a religious group, and/or an Internet forum.

The phrase "transmitted within the organization," as used herein, generally refers to any messages sent and/or received by a member of the organization. In some examples, a message transmitted within the organization may be sent by one member of the organization and received by one or more other members of the organization. In other examples, a message transmitted within the organization may be sent from outside the organization to a member of the organization. Additionally or alternatively, a message transmitted within the organization may be sent from a member of the organization to someone outside the organization.

Collection module 104 may collect the electronic messages in a variety of ways. For example, collection module 104 may collect electronic messages from an archive server that stores archive copies of electronic messages. In another example, collection module 104 may collect electronic messages from a database. Additionally or alternatively, collection module 104 may collect electronic messages from an electronic message server. In some embodiments, collection module 104 may collect electronic messages from message logs. In one embodiment, collection module 104 may collect electronic messages by using an application programming interface of a service that stores the electronic messages.

In some embodiments, collection module 104 may collect electronic messages transmitted within the organization by periodically collecting new electronic messages transmitted within the organization. In some examples, collection module 104 may, at set intervals, collect every electronic message sent within the interval. For example, collection module 104 may collect electronic messages every day, week, or month. In other examples, collection module 104 may continuously collect electronic messages, for example by collecting messages as soon as the messages are sent.

In one embodiment, collection module 104 may collect electronic messages transmitted within the organization by collecting a predefined percentage of a total number of electronic messages transmitted within the organization. For example, collection module 104 may collect every tenth electronic message transmitted within the organization. In another example, collection module 104 may collect a randomly-selected 20% of messages transmitted within the organization.

At step 304, one or more of the systems described herein may create a message graph for the organization where (a) each vertex of the message graph represents a sender of an electronic message within the electronic messages and/or a recipient of an electronic message within the electronic messages and (b) each edge of the message graph represents at least one electronic message within the electronic messages and connects a vertex representing a sender of at least one electronic message with a vertex representing a recipient of at least one electronic message. For example, creation module 106 may, as part of computing device 202 in FIG. 2, create message graph 122 for the organization where each vertex 124 represents a sender and/or recipient of an electric message and each edge 126 represents at least one electronic message.

The term "message graph," as used herein, generally refers to any representation of data as a set of vertices and a set of edges that connect two vertices. Creation module 106 may store a message graph in any relevant type of data structure. In some embodiments, each vertex of the message graph may represent a member of the organization who has sent and/or received at least one electronic message, a person who has sent an electronic message to a member of the organization, and/or a person who has received an electronic message from a member of the organization. Additionally or alternatively, each edge of the message graph may represent an electronic message sent and/or received by a member of the organization.

Creation module 106 may create the message graph in a variety of ways. In some embodiments, creation module 106 may create a message graph with undirected edges. In other embodiments, creation module 106 may create a message graph with directed edges that represent in which direction the electronic message was sent. In some embodiments, creation module 106 may create a message graph with unweighted edges. In other embodiments, creation module 106 may create a message graph with weighted edges where the weight of each edge corresponds to the number of electronic messages represented by the edge. In one example, creation module 106 may create a message graph and then periodically update the message graph with data from new electronic messages.

At step 306, one or more of the systems described herein may extract a plurality of topics from the plurality of electronic messages transmitted within the organization. For example, extraction module 108 may, as part of computing device 202 in FIG. 2, extract topic 128 from the plurality of electronic messages transmitted within the organization.

The term "topic," as used herein, generally refers to any way of describing the theme of a discussion and/or an area of expertise. In some embodiments, a topic may consist of and/or be related to one or more keywords. For example, the topic "database administration" may include the keywords "SQL," "db admin," and/or "database query."

Extraction module 108 may extract topics from the electronic messages in a variety of ways. For example, extraction module 108 may extract the topics from the electronic messages by programmatically determining, by the computing device, the topics of the electronic messages. In some embodiments, extraction module 108 may use one or more natural language processing algorithms to extract topics from the electronic messages.

At step 308, one or more of the systems described herein may annotate the message graph by correlating each topic within the plurality of topics with each edge of the message graph that represents an electronic message related to the topic. For example, annotating module 110 may, as part of computing device 202 in FIG. 2, annotate message graph 122 by correlating each topic 128 within the plurality of topics with each edge 126 of message graph 122 that represents an electronic message related to topic 128.

Annotating module 110 may annotate the message graph in a variety of ways. For example, annotating module 110 may construct a table with three columns, the first representing an edge in the graph, the second representing electronic messages represented by the edge, and the third representing topics and/or keywords extracted from the electronic messages.

Figure 4:
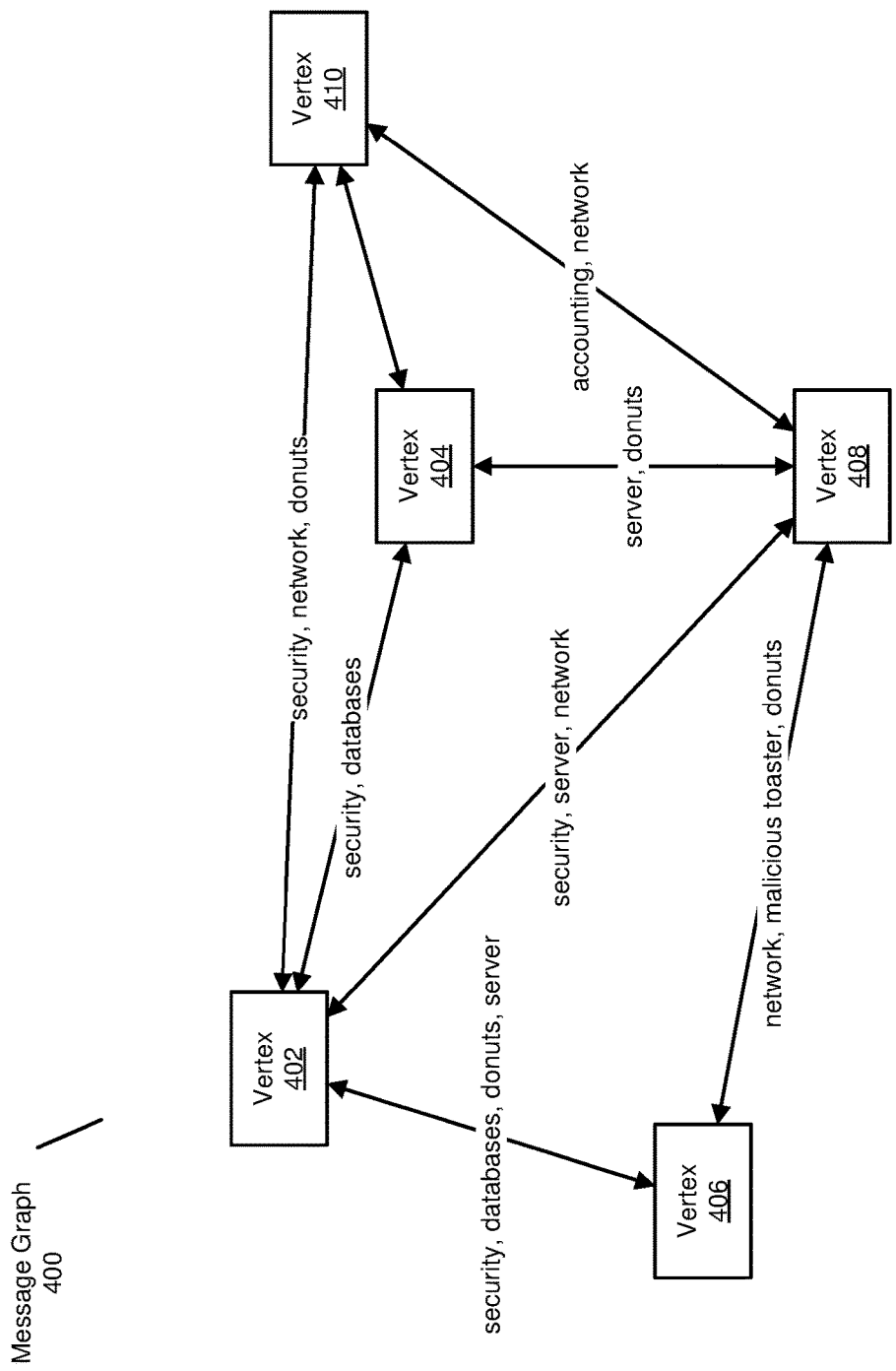
FIG. 4 is a block diagram of an example message graph.

In another embodiment, annotating module 110 may label each edge of the message graph with the topics discussed by the electronic messages represented by that edge. For example, as illustrated in FIG. 4, annotating module 110 may annotate each edge of a message graph 400 with one or more topics. In some examples, the systems described herein may analyze the annotated message graph in order to identify at least one important topic that is correlated with an amount of edges that meets a predetermined threshold for topic importance. In some examples, a predetermined threshold may be a percentage of edges, messages, or conversations (e.g., message threads or chats) that mention the topic, such as 10% or 20%. In other examples, a predetermined threshold may be a total number of edges, messages, or conversations related to the topic, such as 20 or 200. For example, if the predetermined threshold is four edges, then there may be three important topics in message graph 400: "security," "donuts," and "network." If the predetermined threshold is five messages and the edge from vertex 406 to 408 represents five separate messages discussing the subject "malicious toaster," then "malicious toaster" may be an important topic despite not being present in any of the edges connecting to vertices 402, 404, or 410. In another example, if the predetermined threshold is 60% of edges, then no topic in message graph 400 qualifies as an important topic. By determining topics that are frequently discussed by members of the organization, the systems described herein may enable supervisors and/or analysts to determine what is important to members of the organization. For example, the organization represented by message graph 400 may benefit from having donuts at more meetings.

Returning to FIG. 3, at step 310, one or more of the systems described herein may identify, based on an analysis of the annotated message graph, at least one vertex that represents an expert on at least one topic from the plurality of topics. For example, identification module 112 may, as part of computing device 202 in FIG. 2, identify, based on an analysis of the annotated message graph 122, at least one vertex 124 that represents expert 210 on at least one topic 128.

The term "expert," as used herein, generally refers to any individual with an above-average level of knowledge about a given topic. In some embodiments, an expert in a topic may be any person who is the sender and/or recipient of a number of messages about the topic that exceeds a predetermined threshold.

Identification module 112 may identify the vertices that represent experts in a variety of ways. For example, identification module 112 may determine that any vertex connected to a predetermined number of edges correlated with a topic represents an expert for that topic. In other embodiments, identification module 112 may determine that any vertex connected to edges that are correlated with a predetermined number of messages about a topic represents experts in that topic. In some examples, identification module 112 may identify the vertex with the highest number of edges correlated with a topic as representing the expert in that topic. In other examples, identification module 112 may identify the vertex with edges correlated with the highest number of messages associated with a topic as representing the expert in that topic.

In some embodiments, identification module 112 may weight senders of messages differently than recipients of messages for the purpose of determining expertise and/or may weight recipients in the "to" field of an email differently than recipients in the "bcc" and/or "cc" fields of an email. For example, identification module 112 may weight recipients of messages about a topic as having greater expertise than senders of messages about a topic and/or recipients in the "to" field of emails as having greater expertise than recipients in the "bcc" and/or "cc" fields. In some embodiments, identification module 112 may weight recipients of a message sent to a mailing list as lower than recipients of a message sent to individuals. For example, identification module 112 may assign 3 expertise points to recipients in the "to" field, 2 expertise points to senders of a message, and 1 expertise point to recipients in the "cc" or "bbc" fields and/or mailing list recipients. In this example, someone who has directly received three messages about a topic, sent two messages about the topic, been copied on one message about the topic and received three mailing list messages about the topic may have an expertise rating of 17 for the topic.

In some embodiments, identification module 112 may identify as an expert any vertex with a weighted expertise rating above a certain threshold. In other embodiments, identification module 112 may identify as experts the vertices with the top percentage of expertise ratings. For example, identification module 112 may identify the vertices with the highest 10% of expertise ratings as being experts in the topic. In another embodiment, identification module 112 may identify a set number of experts for a topic. For example, identification module 112 may identify the vertices with the five highest expertise ratings as experts.

In one embodiment, identification module 112 may identify at least one vertex that represents an expert on the topic by generating a ranked list of vertices that represent experts on the topic. For example, identification module 112 may rank vertices according to edges, messages, and/or weighted expertise rating and may present a list of all the vertices that meet a predetermined threshold for expertise. In some examples, the predetermined threshold for expertise may be a percentage, such as the top 10% of vertices, ranked according to number of messages. In other examples, the predetermined threshold may be a set number of vertices, such as the 10 highest-rated vertices, ranked according to weighted expertise rating. Additionally or alternatively, the predetermined threshold may be a set number of edges, messages, and/or total expertise rating, such as any vertices with at least six edges correlated with the topic, ranked from most to fewest edges.

Figure 5:
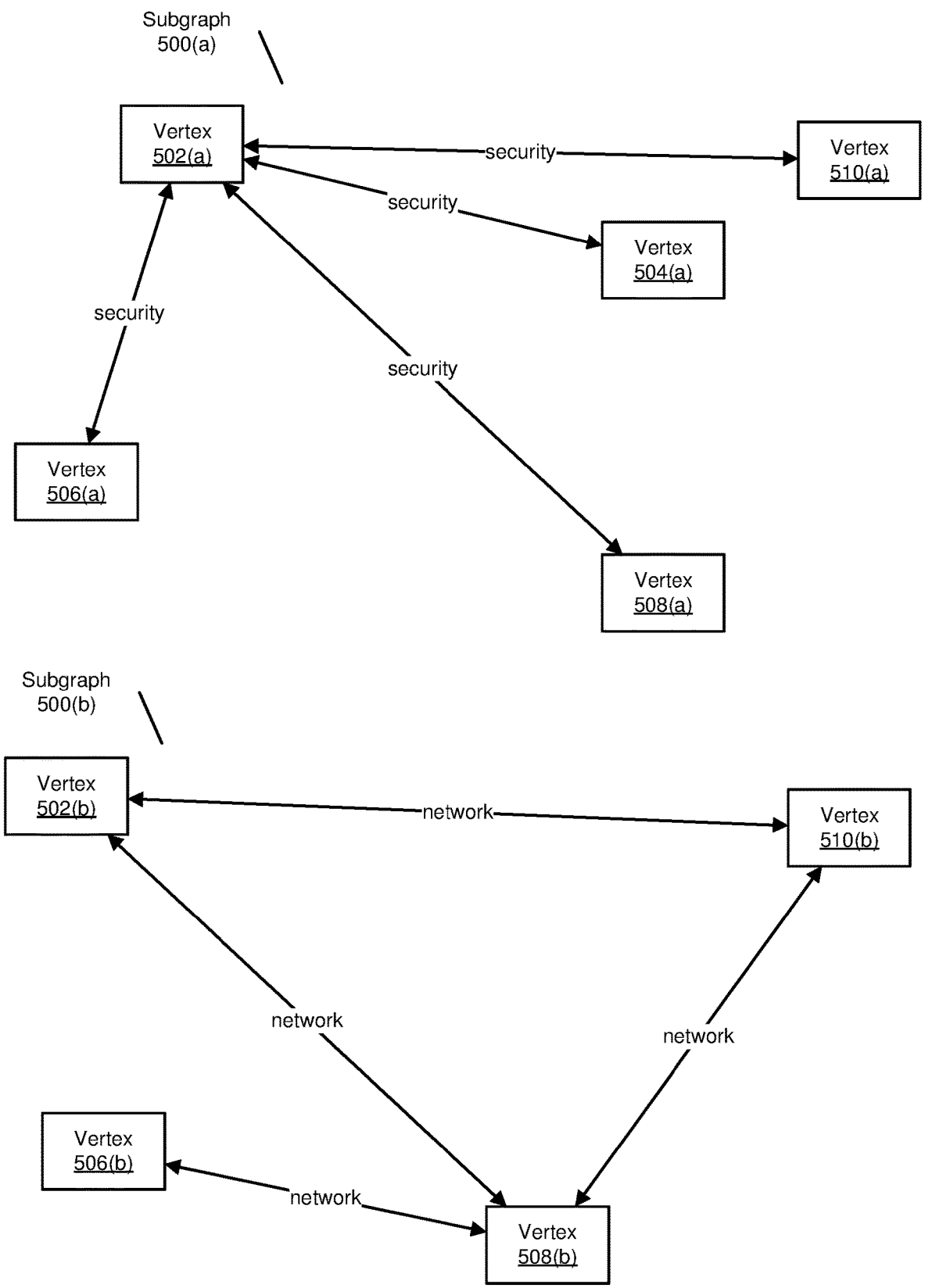
FIG. 5 is a block diagram of an example message graph.

In some embodiments, identification module 112 may identify the vertex that represents an expert on the topic by isolating a sub-graph of the annotated message graph that includes electronic messages related to the topic and does not include electronic messages not related to at least one topic. For example, as illustrated in FIG. 5, subgraph 500(*a*) may be a subgraph of message graph 400 that includes only the edges from message graph 400 correlated with the topic "security." In one example, identification module 112 may analyze the edges between vertices 502(*a*), 504(*a*), 506(*a*), 508(*a*), and/or 510(*a*) in order to determine which vertex or vertices represent an expert or experts on the topic of security. In this example, identification module 112 may identify vertex 502(*a*) as representing an expert on the topic of "security" due to vertex 502(*a*) having the highest number of edges in the topical subgraph.

Similarly, a subgraph 500(*b*) consisting of vertices 502(*b*), 506(*b*), 508(*b*), and/or 510(*b*) that have edges that are correlated with the topic "network." In this example, identification module 112 may identify vertex 508(*b*) as representing an expert on the topic of "network" due to vertex 508(*b*) having the highest number of edges in the topical subgraph. In some embodiments, identification module 112 may require a minimum number of edges, a minimum number of messages, and/or a minimum weighted expertise score to classify a vertex as representing an expert. For example, identification module 112 may require a vertex to be connected to at least four edges correlated with a topic in order to be classified as an expert on that topic. In this example, identification module 112 may determine that there are no experts in the topic of "network." In some embodiments, identification module 112 may use a PAGERANK algorithm on the subgraph and/or may identify the vertex with the highest PAGERANK score as the expert.

In one embodiment, annotating module 110 may annotate the message graph by labeling each edge of the message graph with a timestamp of at least one electronic message represented by the edge and identification module 112 may identify, based on the analysis of the annotated message graph, the vertex that represents an expert on the topic by basing the analysis of the annotated message graph at least in part on at least one timestamp of at least one edge of the annotated message graph. For example, identification module 112 may assign a lower rating to messages with older timestamps. In some embodiments, identification module 112 may assign a lower rating to any message older than a certain age. Additionally or alternatively, identification module 112 may progressively lower the weight of older messages. For example, a message sent yesterday may have a weight of "1," a message sent last month may also have a weight of "1," a message sent six months ago may have a weight of "0.5," and a message sent a year ago may have a weight of "0.2." In one embodiment, identification module 112 may weight messages older than a certain age as zero, essentially eliminating those messages from consideration. In some embodiments, identification module 112 may weight messages both by age and by whether the associated vertex is a sender or recipient.

In one embodiment, identification module 112 may identify, based on the analysis of the annotated message graph, at least one vertex that represents an expert on at least one topic by specifying at least two topics and identifying at least one vertex that represents an expert on all of the topics. In some examples, identification module may receive a list of topics and may identify an expert in all of the topics on the list. In some embodiments, identification module 112 may create a subgraph of the message graph that consists of messages related to any of the topics on the list and may use the subgraph to identify an expert in all of the topics. In some examples, identification module 112 may weight different topics as having different importance and may identify an expert based on the weighted expertise rank of experts in multiple topics. For example, if a user is looking for an expert on the topic of network security who is also knowledgeable about web security but is more interested in network security, identification module 112 may weight expertise in network security higher than expertise in web security when determining whom to recommend as an expert.

As explained in connection with method 300 above, the systems and methods described herein may assist members of an organization in determining who in the organization has desired expertise. The systems and methods described herein may create a communication graph of all or a portion of the emails sent within an organization, label the graph with topics extracted from the emails, and then create subgraphs with the emails about one or more chosen topics in order to determine who regularly corresponds about those topics. By programmatically extracting topics rather than using a pre-set list of keywords, the systems and methods described herein may identify more topics of discussion and expertise than the drafters of a manual list may be aware of. In some example, using broad topics instead of keywords may enable the systems and methods described herein to provide useful answers to inexact searches, such as by including experts in "SQL" when a searcher requests experts in "database queries." Additionally, by analyzing an annotated message graph to discover popular topics of discussion, the systems and methods described herein may provide valuable insight into topics that are important to members of an organization.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive electronic message data to be transformed, transform the electronic message data by normalizing it, output a result of the transformation to a message graph construction algorithm, use the result of the transformation to construct a message graph, and store the result of the transformation to the message graph. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying subject-matter experts, at least a portion of the method being performed by a computing device comprising at least one processor, the method comprising:
   collecting, by the computing device, a plurality of electronic messages transmitted within an organization;
   creating a message graph for the organization wherein:
      each vertex of the message graph represents at least one of a sender of an electronic message within the plurality of electronic messages and a recipient of an electronic message within the plurality of electronic messages; and
      each edge of the message graph represents at least one electronic message within the plurality of electronic messages and connects a vertex representing a sender of the at least one electronic message with a vertex representing a recipient of the at least one electronic message;
   extracting a plurality of topics from the plurality of electronic messages transmitted within the organization;
   annotating the message graph by correlating each topic within the plurality of topics with each edge of the message graph that represents an electronic message related to the topic; and
   identifying, based on an analysis of the annotated message graph, at least one vertex that represents an expert on at least one topic from the plurality of topics, wherein identifying the at least one vertex comprises:
      specifying at least two topics;
      identifying at least one vertex that represents an expert on all of the at least two topics;
      weighting the at least two topics as having a different importance to the expert on all of the at least two topics, wherein one of the at least two topics has a higher importance to the expert than another one of the at least two topics;
      determining a weighted expertise ranking of experts in the at least two topics; and
      identifying the expert based on the one of the at least two topics having the higher importance to the expert and the weighted expertise ranking of the experts in the at least two topics.

2. The computer-implemented method of claim 1, wherein identifying, based on the analysis of the annotated message graph, the at least one vertex that represents an expert on the at least one topic comprises:
   isolating a sub-graph of the annotated message graph that comprises electronic messages related to the at least one topic and does not comprise electronic messages not related to the at least one topic; and
   analyzing the sub-graph to identify the at least one vertex that represents an expert on the at least one topic.

3. The computer-implemented method of claim 1, wherein identifying, based on the analysis of the annotated message graph, the at least one vertex that represents an expert on the at least one topic comprises generating a ranked list of vertices that represent experts on the at least one topic.

4. The computer-implemented method of claim 1, wherein extracting the plurality of topics from the plurality of electronic messages comprises programmatically determining, by the computing device, the plurality of topics.

5. The computer-implemented method of claim 1, wherein collecting, by the computing device, the plurality of electronic messages transmitted within the organization comprises collecting a predefined percentage of a total number of electronic messages transmitted within the organization.

6. The computer-implemented method of claim 1, wherein collecting, by the computing device, the plurality of electronic messages transmitted within the organization comprises periodically collecting new electronic messages transmitted within the organization.

7. The computer-implemented method of claim 1, wherein:
   annotating the message graph comprises labeling each edge of the message graph with a timestamp of at least one electronic message represented by the edge; and identifying, based on the analysis of the annotated message graph, the at least one vertex that represents an expert on the at least one topic comprises basing the analysis of the annotated message graph at least in part on at least one timestamp of at least one edge of the annotated message graph.

8. The computer-implemented method of claim 1, further comprising analyzing the annotated message graph in order to identify at least one important topic that is correlated with an amount of edges that meets a predetermined threshold for topic importance.

9. The computer-implemented method of claim 1, wherein the at least two topics comprise at least two different security topics.

10. A system for identifying subject-matter experts, the system comprising:
a collection module, stored in memory, that collects, by a computing device, a plurality of electronic messages transmitted within an organization;
a creation module, stored in memory, that creates a message graph for the organization wherein:
each vertex of the message graph represents at least one of a sender of an electronic message within the plurality of electronic messages and a recipient of an electronic message within the plurality of electronic messages; and
each edge of the message graph represents at least one electronic message within the plurality of electronic messages and connects a vertex representing a sender of the at least one electronic message with a vertex representing a recipient of the at least one electronic message;
an extraction module, stored in memory, that extracts a plurality of topics from the plurality of electronic messages transmitted within the organization;
an annotating module, stored in memory, that annotates the message graph by correlating each topic within the plurality of topics with each edge of the message graph that represents an electronic message related to the topic;
an identification module, stored in memory, that identifies, based on an analysis of the annotated message graph, at least one vertex that represents an expert on at least one topic from the plurality of topics, wherein the identification module identifies the at least one vertex by:
specifying at least two topics;
identifying at least one vertex that represents an expert on all of the at least two topics;
weighting the at least two topics as having a different importance to the expert on all of the at least two topics, wherein one of the at least two topics has a higher importance to the expert than another one of the at least two topics;
determining a weighted expertise ranking of experts in the at least two topics; and
identifying the expert based on the one of the at least two topics having the higher importance to the expert and the weighted expertise ranking of the experts in the at least two topics; and
at least one physical processor configured to execute the collection module, the creation module, the extraction module, the annotating module, and the identification module.

11. The system of claim 10, wherein the identification module identifies, based on the analysis of the annotated message graph, the at least one vertex that represents an expert on the at least one topic by:
isolating a sub-graph of the annotated message graph that comprises electronic messages related to the at least one topic and does not comprise electronic messages not related to the at least one topic; and
analyzing the sub-graph to identify the at least one vertex that represents an expert on the at least one topic.

12. The system of claim 10, wherein the identification module identifies, based on the analysis of the annotated message graph, the at least one vertex that represents an expert on the at least one topic by generating a ranked list of vertices that represent experts on the at least one topic.

13. The system of claim 10, wherein the extraction module extracts the plurality of topics from the plurality of electronic messages by programmatically determining, by the computing device, the plurality of topics.

14. The system of claim 10, wherein the collection module collects, by the computing device, the plurality of electronic messages transmitted within the organization by collecting a predefined percentage of a total number of electronic messages transmitted within the organization.

15. The system of claim 10, wherein the collection module collects, by the computing device, the plurality of electronic messages transmitted within the organization by periodically collecting new electronic messages transmitted within the organization.

16. The system of claim 10, wherein:
the annotating module annotates the message graph by labeling each edge of the message graph with a timestamp of at least one electronic message represented by the edge; and
the identification module identifies, based on the analysis of the annotated message graph, the at least one vertex that represents an expert on the at least one topic by basing the analysis of the annotated message graph at least in part on at least one timestamp of at least one edge of the annotated message graph.

17. The system of claim 10, wherein the identification module analyzes the annotated message graph in order to identify at least one important topic that is correlated with an amount of edges that meets a predetermined threshold for topic importance.

18. The system of claim 10, wherein the at least two topics comprise at least two different security topics.

19. A non-transitory computer-readable medium comprising one or more computer-readable instructions that, when executed by at least one processor of a computing device, cause the computing device to:
collect, by the computing device, a plurality of electronic messages transmitted within an organization;
create a message graph for the organization wherein:
each vertex of the message graph represents at least one of a sender of an electronic message within the plurality of electronic messages and a recipient of an electronic message within the plurality of electronic messages; and
each edge of the message graph represents at least one electronic message within the plurality of electronic messages and connects a vertex representing a sender of the at least one electronic message with a vertex representing a recipient of the at least one electronic message;
extract a plurality of topics from the plurality of electronic messages transmitted within the organization;

annotate the message graph by correlating each topic within the plurality of topics with each edge of the message graph that represents an electronic message related to the topic; and identify, based on an analysis of the annotated message graph, at least one vertex that represents an expert on at least one topic from the plurality of topics, wherein the at least one vertex is identified by:

specifying at least two topics;

identifying at least one vertex that represents an expert on all of the at least two topics;

weighting the at least two topics as having a different importance to the expert on all of the at least two topics, wherein one of the at least two topics has a higher importance to the expert than another one of the at least two topics;

determining a weighted expertise ranking of experts in the at least two topics; and identifying the expert based on the one of the at least two topics having the higher importance to the expert and the weighted expertise ranking of the experts in the at least two topics.

20. The non-transitory computer-readable medium of claim 19, wherein the one or more computer-readable instructions cause the computing device to identify, based on the analysis of the annotated message graph, the at least one vertex that represents an expert on the at least one topic by:

isolating a sub-graph of the annotated message graph that comprises electronic messages related to the at least one topic and does not comprise electronic messages not related to the at least one topic; and analyzing the sub-graph to identify the at least one vertex that represents an expert on the at least one topic.

* * * * *